(12) United States Patent
Morita

(10) Patent No.: US 7,393,582 B2
(45) Date of Patent: Jul. 1, 2008

(54) COMPOSITE SILICONE RUBBER PARTICLES AND METHOD OF THEIR MANUFACTURE

(75) Inventor: Yoshitsugu Morita, Chiba Prefecture (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 393 days.

(21) Appl. No.: 10/540,797

(22) PCT Filed: Dec. 17, 2003

(86) PCT No.: PCT/JP03/16202

§ 371 (c)(1),
(2), (4) Date: Jun. 27, 2005

(87) PCT Pub. No.: WO2004/061002

PCT Pub. Date: Jul. 22, 2004

(65) Prior Publication Data

US 2006/0084758 A1    Apr. 20, 2006

(30) Foreign Application Priority Data

Dec. 27, 2002   (JP) .............................. 2002-381961

(51) Int. Cl.
*B32B 5/16*   (2006.01)
(52) U.S. Cl. ....................... 428/327; 428/407
(58) Field of Classification Search ................ 428/403, 428/407, 447, 327
See application file for complete search history.

(56) References Cited

U.S. PATENT DOCUMENTS

| 4,818,614 | A | * | 4/1989 | Fukui et al. ................. 428/403 |
| 5,188,899 | A | * | 2/1993 | Matsumoto et al. ......... 428/405 |
| 5,492,945 | A | | 2/1996 | Morita et al. |
| 5,538,793 | A | | 7/1996 | Inokuchi et al. |
| 5,756,568 | A | * | 5/1998 | Morita et al. ................ 524/268 |
| 5,945,471 | A | * | 8/1999 | Morita et al. ............... 524/409 |
| 5,948,469 | A | | 9/1999 | Morita et al. |

FOREIGN PATENT DOCUMENTS

| EP | 0 647 672 | 10/1994 |
| EP | 0 661 334 | 12/1994 |
| JP | 64-014250 | 1/1989 |
| JP | 4-348143 | 12/1992 |
| JP | 7-102075 | 4/1995 |
| JP | 7-196815 | 8/1995 |

OTHER PUBLICATIONS

English language Abstract for JP 64-014250 extracted from *Searching PAJ* database dated Aug. 4, 2005.

* cited by examiner

*Primary Examiner*—H. T Le
(74) *Attorney, Agent, or Firm*—Howard & Howard Attorneys, P.C.

(57) ABSTRACT

Composite silicone rubber particles of this invention include silicone rubber particles A and silicone rubber particles B, wherein the surface of said particles A is covered with said particles B having sizes smaller than sizes of particles A. The composite silicone rubber particles are characterized by exhibiting excellent flowability and dispersibility, and in case of adding the particles to various materials, improving tactile feeling, reducing inner stress, and providing lubricating and oil-and-fat absorption properties.

17 Claims, 4 Drawing Sheets

COMPOSITE SILICONE RUBBER PARTICLES AND METHOD OF THEIR MANUFACTURE

TECHNICAL FIELD

This invention relates to composite silicone rubber particles and to a method of their manufacture. More specifically, this invention relates to composite silicone rubber particles exhibiting excellent flowability and dispersibility, and in case of adding the particles to various materials, improving tactile feeling, reducing inner stress, and providing lubricating and oil-and-fat absorption properties. This invention also relates to an efficient method of manufacturing the aforementioned composite silicone rubber particles.

BACKGROUND ART

Japanese Laid-Open Patent Application Publication (hereinafter referred to as Kokai) Hei 4-348143 and Kokai Hei 7-102075 disclose composite silicone rubber particles that consist of silicone rubber particles, the surfaces of which are covered with fine particles of metal oxide. Furthermore, Kokai Hei 7-196815 discloses composite silicone rubber particles that consist of silicone rubber particles, the surfaces of which are coated with fine particles of silicone resin. In comparison to conventional silicone rubber particles, the aforementioned composite silicone rubber particles exhibit better flowability, and may impart to rubbers, plastics, coating materials, inks, waxes, cosmetic materials, etc. such properties as thermal resistance, cold resistance, weather resistance, water repellency, lubricity, mold-release properties, inner-stress relaxation properties, etc.

However, to provide excellent flowability, low aggregation, and good compoundability, such composite particles have to contain fine silicone resin particles in combination with fine metal-oxide particles. In this case, however, they become unfavorable for cosmetic use. This is because the addition of the aforementioned particles imparts the tactile feeling of hardness to the cosmetics and leads to loss of the satisfactory tactile feeling of softness expected from cosmetic products. Furthermore, addition of such particles impairs an absorption of oil-and fat such as sebum.

Furthermore, Kokai Sho 64-14250 discloses composite silicone rubber particles that consist of silicone gel particles, the surfaces of which are covered with silicone rubber particles. However, the aforementioned composite particles have low flowability and dispersibility, are difficult to attach to various materials, and cannot easily acquire lubricating and sliding properties.

Therefore, it is an object of the present invention to provide composite silicone rubber particles exhibiting excellent flowability and dispersibility, and in case of adding the particles to various materials, improving tactile feeling, reducing inner stress, and providing lubricating and oil-and-fat absorption properties. Another object is to provide an efficient method of manufacturing the composite silicone rubber particles with the aforementioned properties.

DISCLOSURE OF INVENTION

Composite silicone rubber particles of the present invention comprise silicone rubber particles A and silicone rubber particles B wherein the surface of the silicone rubber particles A is covered with the silicone rubber particles B having particle size smaller than the particle size of the aforementioned particles A.

A method of the invention for manufacturing composite silicone rubber particles comprises removing a dispersion medium from a dispersion or slurry that contains silicone rubber particles A and silicone rubber particles B having sizes smaller than those of the silicone rubber particles A.

DETAILED DESCRIPTION OF THE INVENTION

Figure 1:
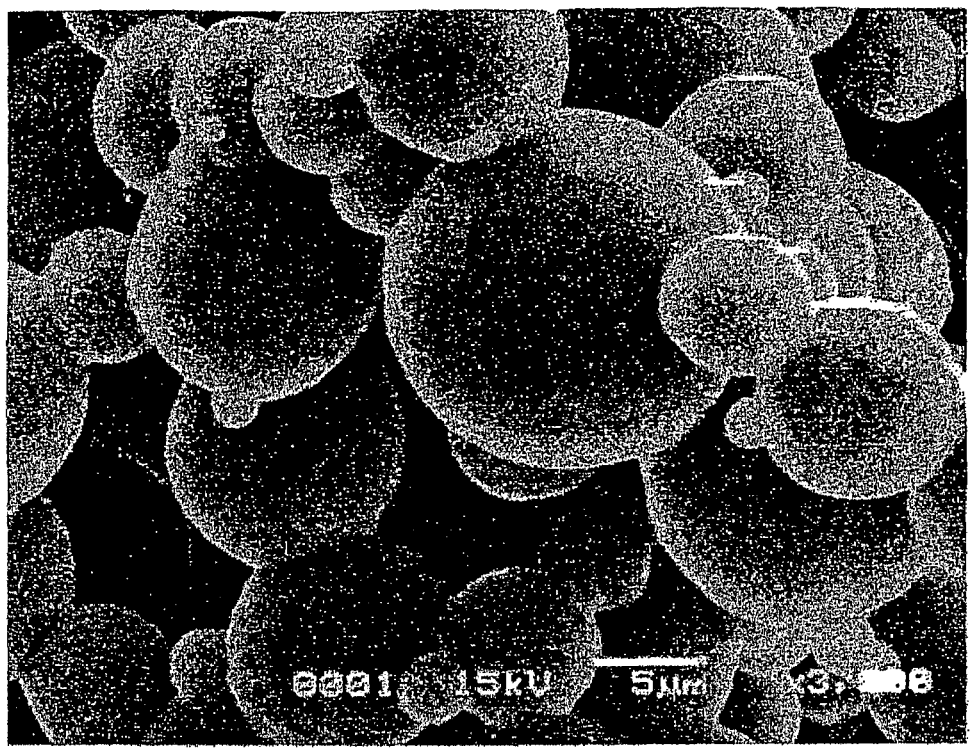
FIG. 1 is an electron-microscope photograph of silicone rubber particles obtained in Reference Example 1.

The composite silicone rubber particles of the present invention comprise silicone rubber particles A, the surfaces of which are coated with silicone rubber particles B having sizes smaller than those of the silicone rubber particles A. In the composite particles, the silicone rubber particles B can be rigidly fixed to the surfaces of the silicone rubber particles A or attached to these surfaces by adherence. There are no special restrictions to the structure and method of preparation of the silicone rubber particles A and B, except that they should be different in size. These silicone rubber particles may contain an optional ingredient, e.g., silicone oil, organosilane, inorganic particles, or organic particles. However, to prevent decrease in flowability and increase in aggregation of the composite silicone rubber particles, it is recommended that an amount of optional ingredient in the silicone rubber particles is not exceeding 50 wt. %, and preferably, is not exceeding 10 wt. %. There are no special restrictions with regard to the shape of the silicone rubber particles, but for better flowability, it is preferable that the silicone rubber particles A are spherical in shape. It is recommended that the silicone rubber particles B are also spherical in shape. Although there are no special restrictions with regard to the average sizes of the silicone rubber particles, it is recommended that the average size of particles A is at least five times bigger than the average size of the silicone rubber particles B. It is possible to sufficiently cover on the surface of the particles A with the particles, if the average-size ratio increases. From this point of view, it is preferable that the aforementioned ratio is equal 10 or more. More specifically, it is recommended that the average size of the silicone rubber particles A is 1 to 500 µm, preferably, 1 to 200 µm. It is recommended that the average size of the silicone rubber particles B is 0.01 to 50 µm, and preferably, 0.01 to 10 µm.

There are no special restrictions with regard to hardness of the aforementioned silicone rubber particles. It is recommended, however, that hardness of the silicone rubber particles A is lower than hardness of the silicone rubber particles B. More specifically, the hardness of said silicone rubber particles A measured by a type-A durometer, as specified by JIS K 6253, should not exceed 50, and should be preferably between 5 and 45, and even more preferably, between 10 and 45. The hardness of silicone rubber particles B measured by a type-A durometer, as specified by JIS K 6253, should be no less than 50, preferably between 50 and 99, and even more preferably between 60 and 99. The lower is the hardness of the silicone rubber particles A, the better is the tactile sensation of the composite silicone rubber particles. The higher is the hardness of the silicone rubber particles, the better is the flowability of the composite silicone rubber particles.

The following is a more detailed description of the method for manufacturing the composite silicone rubber particles of the present invention. The method of the present invention comprises removing a dispersion medium from a dispersion or slurry that contains the silicone rubber particles A and the silicone rubber particles B having sizes smaller than those of the silicone rubber particles A, as described above.

The following compositions may be used for the preparation of the silicone rubber particles: a silicone rubber composition curable by a condensation reaction between silicon-bonded hydrolysable groups and silanol groups, or between silicon-bonded hydrogen atoms and silanol groups; a silicone rubber composition curable by an addition reaction between mercaptosilyl and aliphatic unsaturated groups; a silicone rubber composition curable by a hydrosilylation reaction between aliphatic unsaturated groups and silicon-bonded hydrogen atoms; and a silicone rubber composition curable by photopolymerizing vinyl ether groups. The most preferable for use are silicone rubber compositions curable by condensation and hydrosilylation, in view of their good reactivity and simplicity of reaction procedures.

The silicone rubber compositions curable by hydrosilylation may contain at least the following components: an organopolysiloxane with alkenyl groups, an organopolysiloxane with silicon-bonded hydrogen atoms, and a platinum-type catalyst. The organopolysiloxane with alkenyl groups may have the alkenyl groups in the form of vinyl groups, allyl groups, butenyl groups, pentenyl groups, hexenyl groups, and the like. Of these, the most preferable are vinyl groups or hexenyl groups. Silicon-bonded groups other than alkenyl groups may comprise unsubstituted or substituted univalent hydrocarbon groups, such as methyl groups, ethyl groups, propyl groups, butyl groups, or similar alkyl groups; cyclopentyl groups, cyclohexyl groups, or similar cycloalkyl groups; phenyl groups, tolyl groups, xylyl groups, or similar aryl groups; benzyl groups, phenethyl groups, 3-phenylpropyl groups, or similar aralkyl groups; 3-chloropropyl groups, 3,3,3-trifluoropropyl groups, or similar halogenated alkyl groups. Molecular structure of the aforementioned organopolysiloxane is exemplified by a linear, cyclic, net-like, and partially-branched linear. The most preferable is the linear molecular structure. Although there are no special restrictions with regard to viscosity of the aforementioned organopolysiloxne, except that the silicone rubber composition has to be dispersible in water, it is recommended that the viscosity of the organopolysiloxane is 20 to 100,000 mPa·s at 25° C., preferably, 20 to 10,000 mPa·s at 25° C.

The silicon-bonded groups, other than hydrogen atoms contained in the organopolysiloxanes with silicon-bonded hydrogen atoms, may comprise the same unsubstituted or substituted univalent hydrocarbon groups as those mentioned above. Molecular structure of the aforementioned oragnopolysiloxane is exemplified by a linear, cyclic, net-like, and partially-branched linear. There are no special restrictions with regard to the viscosity of the aforementioned organopolysiloxane, except that the silicone rubber composition has to be dispersible in water. It can be recommended, however, that the viscosity of the organopolysiloxane is 1 to 10,000 mPa·s at 25° C. There are no special restrictions with regard to the amount in the silicone rubber composition, except that the amount of the ortorganopolysiloxane has to be sufficient for cross-linking the silicone rubber composition by hydrosilylation. It may be recommended that the amount of the organopolysiloxane is 0.3 to 500 parts by weight for each 100 parts by weight of the organopolysiloxane with alkenyl groups.

In the composition, the platinum-type catalyst is used for acceleration of the hydrosilylation reaction. The catalyst may comprise a platinum catalyst, rhodium catalyst, and palladium catalyst, of which the platinum catalyst is preferable. This platinum catalyst can be represented by a chloroplatinic acid, alcohol solutions of chloroplatinic acid, platinum-olefin complexes, complexes of platinum with alkenylsiloxane, platinum black, or platinum on a silica carrier. The catalyst should be used in an amount sufficient for accelerating hydrosilylation of the composition. For example, in the case of the platinum catalyst, it can be recommended that an amount of metallic platinum is 0.1 to 1000 ppm per total weight of the organopolysiloxanes.

The aforementioned platinum catalyst can be first dissolved in to the silicone rubber composition and then the composition with the catalyst is dispersed in water, or the silicone rubber composition can be dispersed in water without the catalyst, and then the catalyst can be added to the dispersion. In the latter case, it is preferable to form an aqueous dispersion of the platinum catalyst particles dispersed in water and having an average particle size of 1 µm or less.

The silicone rubber composition suitable for forming silicone rubber particles curable by a condensation reaction may comprise the following components: an organopolysiloxane that contains, per molecule, at last two silicon-bonded hydroxyl groups, or a hydrolysable group such as an alkoxy group, oxime group, acetoxy group, aminoxy group, etc.; a silane-type cross-linking agent that contains, per molecule, at least three silicon-bonded hydrolysable groups such as an alkoxy group, oxime group, acetoxy group, aminoxy group, etc., and a condensation-reaction catalyst, such as an organotin compound, organo-titanium compound, etc. Of these, the most preferable is the silicone-rubber composition that comprises an organopolysiloxane that contains, per molecule, at least two silicon-bonded hydrolysable groups, an organopolysiloxane that contains, per molecule, at least two silanol groups, and a condensation-reaction catalyst.

The hydrolysable groups contained in the aforementioned organopolysiloxane with silicon-bonded hydrolysable groups may be represented by methoxy, ethoxy, methoxyethoxy, or similar alkoxy groups; methylethylketoxime, dimethylketoxime, or similar oxime group; as well as acetoxy group and aminoxy groups. Of these, the most preferable are alkoxy groups. Silicon-bonded groups, other than hydrolysable groups, may comprise unsubstituted or substituted univalent hydrocarbon groups such as methyl groups, ethyl groups, propyl groups, butyl groups, or similar alkyl groups; cyclopentyl groups, cyclohexyl groups, or similar cycloalkyl groups; vinyl groups, allyl groups, butenyl groups, pentenyl groups, hexenyl groups; phenyl groups, tolyl groups, xylyl groups, or similar aryl groups; benzyl groups, phenethyl groups, 3-phenylpropyl groups, or similar aralkyl groups; 3-chloropropyl groups, 3,3,3-trifluoropropyl groups, or similar halogenated alkyl groups. Molecular structure of the aforementioned organopolysiloxanes is exemplified by a linear, cyclic, net-like, and a partially-branched linear. The most preferable molecular structure is the linear or partially-branched linear. There is no special restriction with regard to the viscosity, except that the silicone rubber composition has to be dispersible in water. It is recommended, however, that the viscosity of the organopolysiloxane is 20 to 100,000 mPa·s at 25° C., preferably 20 to 10,000 mPa·s at 25° C.

Silicon-bonded groups other than silanol groups in the silanol-group-containing organopolysiloxane may be exemplified by the same unsubstituted or substituted univalent hydrocarbon groups mentioned above. Molecular structure of the silanol-group-containing organopolysiloxane may be linear, cyclic, net-like, or partially-branched linear. The most preferable structures are linear or partially-branched linear. There is no special restriction with regard to viscosity of the silanol-group-containing organopolysiloxane, except that the silicone rubber composition has to be dispersible in water. It is recommended, however, that the viscosity of the silanol-group-containing organopolysiloxane is 20 to 100,000 mPa·s at 25° C., and preferably, 20 to 10,000 mPa·s at 25° C. There are no restrictions also with regard to the amount of the silanol-group-containing organopolysiloxane, with the exception that it is should be sufficient for cross-linking by the condensation reaction. It is recommended, however, that the amount of the silanol-group-containing organopolysiloxane is 0.01 to 100 parts by weight for each 100 parts by weight of the organopolysiloxane with silicon-bonded hydrolysable groups.

The condensation-reaction catalyst may be exemplified by a dibutyltin dilaurate, dibutyltin diacetate, tin octanoate, dibutyltin dioctate, tin laurate, or a similar organo-tin compound; tetrabutyl titanate, tetrapropyl titanate, dibutoxy bis(ethylacetoacetate), or a similar organo-titanium compound; as well as a hydrochloric acid, sulfuric acid, dodecylbenzenesulfonic acid, or a similar acidic compound; ammonia, sodium hydroxide, or a similar alkaline compound. Of these, the most preferable are the organo-tin compound and the organo-titanium compound. These catalysts should be used in an amount sufficient for accelerating the condensation reaction. For example, they may be added in an amount of 0.01 to 5 parts by weight, preferably 0.05 to 2 parts by weight, for each 100 parts by weight of the total organopolysiloxanes.

The condensation-reaction catalyst can be added to the silicone composition and then the mixture is dispersed in water, or the silicone composition can be dispersed in water without the catalyst, and then the catalyst can be added to the dispersion afterwards. In the latter case, it is preferable to form an aqueous dispersion of the condensation-reaction catalyst particles dispersed in water and having an average particle size 10 μm or less.

In the manufacturing process, the size of the silicone rubber particles can be controlled by adjusting viscosity of the silicone rubber composition, changing various surface active agents for dispersing the silicone rubber composition in water, or by adjusting the speed of stirring. Furthermore, the size of silicone rubber particles can be easily adjusted by adding curing catalysts for curing the composition after dispersing the silicone rubber composition in a dispersion medium, such as water. The size of the particle can also be adjusted by passing the particles through a sorting sieve.

The following surface-active agents can be used for the above purposes: non-ionic, anionic, cationic, or betaine type surface active agents. The amounts and types of the used surface active agents will determine the size of the obtained silicone rubber particles. For adjusting the sizes of small silicone rubber particles, it is recommended to add the surface active agents in the amount of 0.5 to 50 parts by weight for each 100 parts by weight of the silicone rubber composition. However, for adjusting the size of coarse silicone rubber particles, the amount of the added surface-active agent should be 0.1 to 10 parts by weight for each 100 parts by weight of the silicone rubber composition. Where water is used as a dispersion medium, water should be added in an amount of 20 to 1500 parts by weight for each 100 parts by weight of the silicone rubber composition.

Uniform dispersion of silicone rubber composition in a dispersion medium can be carried out with the use of an emulsifier. Emulsifiers suitable for this purpose may be represented by a homomixer, paddle mixer, Henschel mixer, homo-disperser, colloid mill, propeller agitator, homogenizer, in-line continuous emulsifier, ultrasonic emulsifier, or a vacuum kneader. If necessary, the dispersion or slurry of the silicone rubber composition can be adjusted by adding a curing catalyst for curing, and then the silicone rubber particles are obtained by removing the dispersion medium from the prepared dispersion or slurry by evaporation.

The method of the present invention comprises removing the dispersion medium from the dispersion or slurry that contains silicone rubber particles A and silicone rubber particles B of a size smaller than that of the silicone rubber particles A. Alternatively, however, the process can be carried out by mixing a separately prepared dispersion or slurry of the silicone rubber particles A with a separately prepared dispersion or slurry of the silicone rubber particles B. In the case where water is used as a dispersion medium, water can be removed from the dispersion or slurry by condensing, e.g., by evaporation through heating, filtering, centrifugation, decantation, etc. If necessary, the product can then be washed with water, and dried again by heating under normal or reduced pressure.

The composite particles can be formed either by spray-drying the dispersion in an air flow, or by heating and drying it with the use of a fluidized heat-medium. If after removal of the dispersion medium the composite silicone rubber particles are subject to aggregation, they can be disintegrated, e.g., by using a mortar.

EXAMPLES

In the following examples, all viscosities have values corresponding to 25° C. The following methods were used for measuring characteristics of the silicone rubber particles and the composite silicone rubber particles.

Average Particle Size

Measurement was carried out on an aqueous dispersion of silicone rubber particles using a laser diffraction instrument for measuring particle size distributions (Model LA-500 from Horiba Seisakusho). A median size, which is the particle size corresponding to 50% of the cumulative distribution, was reported as the average particle size.

Hardness

Hardness of silicone rubber particles cured by hydrosilylation was measured by first curing the silicone rubber composition for producing the aforementioned particles in an oven at 100° C. for 1 hour and then measuring the hardness of the sheet by means of a type A durometer, as specified by Japanese Industrial Standard (JIS) K 6253. For measuring hardness of silicone rubber particles curable by a condensation reaction, the silicone-rubber composition for the formation of the particles was allowed to stay for about 1 week at 25° C. and then cured into a 1 mm-thick sheet. Instead of the durometer specified by JIS K 6253, the hardness of the type-A sheet was measured by a Wallace microhardness meter manufactured by H. W. Wallace Co.

Index of Dynamic Viscoelasticity

The index of dynamic viscoelasticity inherent in silicone rubber particles and in composite silicone rubber particles was measured with the use of a viscoelasticity analyzer ARES of Rheometric Scientific, Inc. Measurements were carried out using 25 mm parallel plates, a gap of 0.8 mm to 0.9 mm, and a pressure between the plates within the range of 600 to 1000 g. The strain was 10%, and frequency of oscillations was changed within the range of 0.1 Hz to 50 Hz. The storage modulus of elasticity expressed as G', the loss elastic modulus expressed as G", the composite modulus of elasticity expressed as G*, and the tangent of loss angle tan δ were measured at 1 Hz and 10 Hz.

Oil Absorption—Evaluation of Oil-and-Fat Absorption Properties

A 100 ml-beaker was loaded with 1 g of silicone rubber particles or composite silicone rubber particles, and while the particles were stirred with a glass rod, squalane was added dropwise with the use of a dropping pipette. The amount of squalene (g) that has to be added to form the silicone rubber particles or composite silicone rubber particles into a paste was used as a quantitative criterion of the absorbed oil (squalane g/g).

Bulk Density

Bulk density of silicone rubber particles or composite silicone-rubber particles was determined based on the provisions of JIS K 5101-1991 (Method of Testing Pigments) as an apparent density measured by a static method.

Angle of Repose—Criterion of Flowability 3 g of silicone rubber particles or composite silicone rubber particles were loaded into a polyethylene bag, the content was made loose, and then the repose angle of the silicone rubber particles or composite silicone rubber particles was measured by slowly inclining the bag.

Mesh Pass—Evaluation of Dispersibility 20 g of silicone rubber particles or composite silicone rubber particles were loaded into a #100-mesh sieve or a #200-mesh sieve, and the amount of the particles (wt. %) that passed through the sieves after 10 gentle shakes was used as the aforementioned characteristic.

Reference Example 1

A uniform mixture was prepared from the following components: 97.3 parts by weight of a polydimethylsiloxane end-capped with dimethylvinylsiloxy groups, having a viscosity of 400 mPa·s and containing 2.5 wt. % of a cyclic dimethylsiloxane oligomer mixture having a viscosity of 20 mm²/s; and 2.7 parts by weight of a polyorganosiloxane represented by the following average unit formula:

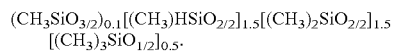

The obtained mixture was further mixed with 50.5 parts by weight of a 1% aqueous solution of a mixture prepared from a secondary tetradecyl ether and a secondary dodecyl ether of ethylene oxide (7 moles added) (dodecyl groups=43 wt. %, tetradecyl groups=57 wt. %, HLB=12.8). An aqueous dispersion was then prepared by emulsifying the obtained mixture in a colloid mill (colloid mill frequency=30 Hz).

An aqueous dispersion of a platinum-type catalyst with an average particle size of 0.3 μm was prepared by mixing 0.01 parts by weight of a solution prepared from isopropyl alcohol and 1,3-divinyl-1,1,3,3-tetramethyldisiloxane of a platinum-1,3-divinyl-1,1,3,3-tetramethyldisiloxane complex and 0.01 parts by weight of a surface-active agent prepared by mixing 1 part by weight of ion-exchange water with a mixture of a secondary tetradecyl ether and secondary dodecyl ether of ethylene oxide (7 moles added) (dodecyl groups=43 wt. %, tetradecyl groups=57 wt. %, HLB=12.8).

Figure 2:
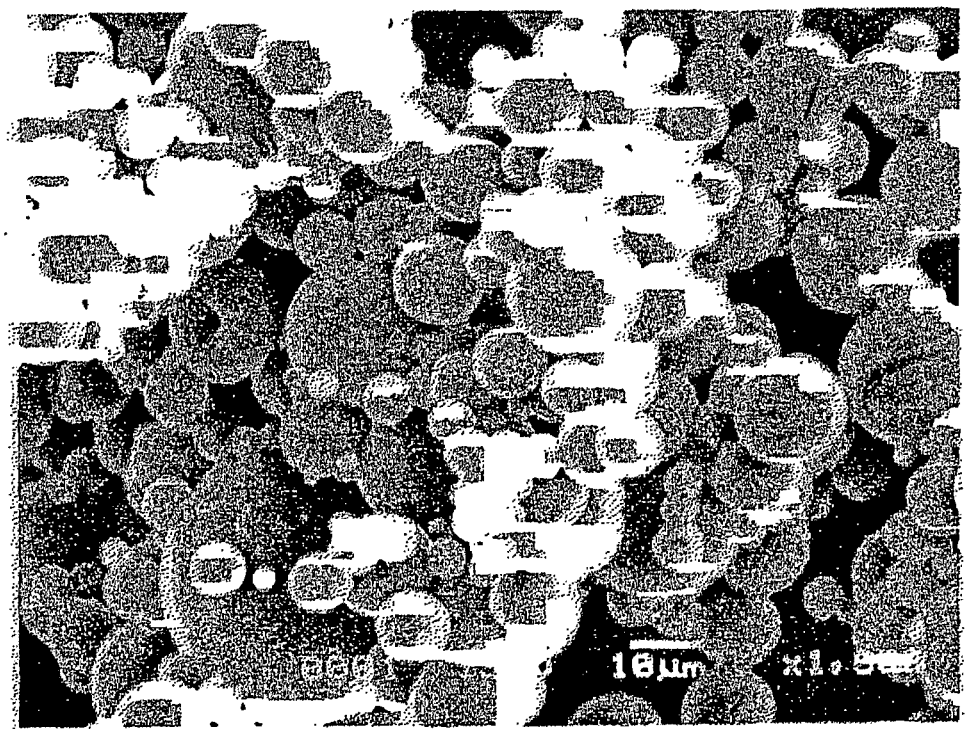
FIG. 2 is an electron-microscope photograph of silicone rubber particles obtained in Reference Example 1.

The aforementioned aqueous dispersion of the silicone rubber composition was mixed with the obtained aqueous dispersion of the platinum catalyst (in weight units, the catalyst was added in an amount of 5 ppm metallic platinum per weight of the silicone rubber composition). The mixture was allowed to stay for 1 day, the composition was cured by hydrosilylation, and as a result, an aqueous dispersion of silicone rubber particles with 50% of solids was produced. The characteristics of the obtained silicone rubber particles are shown in Table 1. FIGS. 1 and 2 are photographs of silicone rubber particles taken on an electron microscope.

Reference Example 2

A uniform mixture was prepared from 55.2 parts by weight of a polydimethylsiloxane end-capped with dimethylhydroxysiloxy groups and having a viscosity of 40 mPa·s (with an average number of repeating units equal to 11) and 44.8 parts by weight of ethyl polysilicate (Silicate-40, the product of Mitsubishi Chemical Co., Ltd.; 40 to 42 wt/% of SiO₂, and 2 or more ethoxy groups). The obtained mixture was combined with another mixture prepared by dissolving 8 parts by weight of a mixture of a secondary tetradecyl ether and secondary dodecyl ether of ethylene oxide (7 moles added) (dodecyl groups=43 wt. %, tetradecyl groups=57 wt. %, HLB=12.8) in 20 parts by weight of pure water. The obtained product was emulsified in a colloid mill (the colloid-mill frequency was 50 Hz) and then mixed with 65 parts by weight of pure water to produce an aqueous dispersion of a silicone rubber composition.

Figure 3:
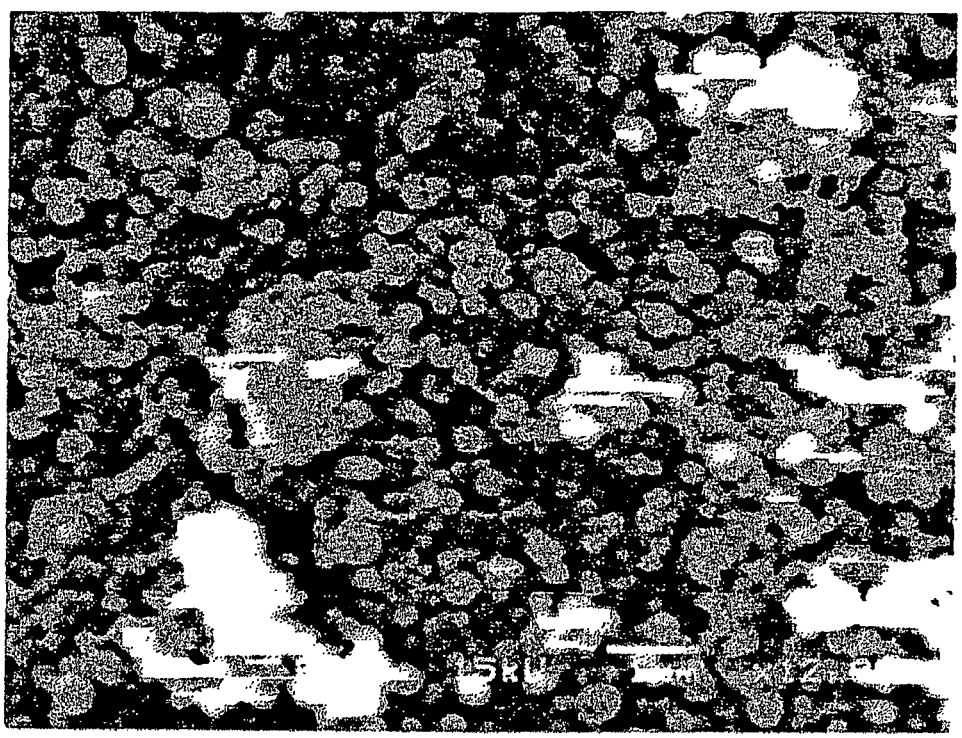
FIG. 3 is an electron-microscope photograph of silicone rubber particles obtained in Reference Example 2.

The aforementioned aqueous dispersion of the silicone rubber composition was mixed with an aqueous dispersion of tin octanoate having an average particle size equal to about 1 μm and prepared by emulsifying 1 part by weight of tin octanoate in 1 part by weight of a mixture of a secondary tetradecyl ether and secondary dodecyl ether of ethylene oxide (7 moles added) (dodecyl groups=43 wt. %, tetradecyl groups=57 wt. %, HLB=12.8) and 9 parts by weight of pure water. The mixture was allowed to stay for 1 day, and as a result, an aqueous dispersion of silicone rubber particles with 31% of solids was produced. The characteristics of the obtained silicone rubber particles are shown in Table 1. FIG. 3 is a photograph of silicone-rubber particles taken on an electron microscope.

Reference Example 3

A uniform mixture was prepared from 10.4 parts by weight of a polydimethylsiloxane end-capped with dimethylhydroxysiloxy groups and having a viscosity of 40 mPa·s (with an average number of repeating units equal to 11) and 89.6 parts by weight of ethyl polysilicate (Silicate-40, the product of Mitsubishi Chemical Co., Ltd.; 40 to 42 wt/% of SiO₂, and 2 or more ethoxy groups). The obtained mixture was combined with another mixture prepared by dissolving 8 parts by weight of a mixture of a secondary tetradecyl ether and secondary dodecyl ether of ethylene oxide (7 moles added) (dodecyl groups=43 wt. %, tetradecyl groups=57 wt. %, HLB=12.8) in 20 parts by weight of pure water. The obtained product was emulsified in a colloid mill (the colloid-mill frequency was 50 Hz) and then mixed with 65 parts by weight of pure water to produce an aqueous dispersion of a silicone rubber composition.

The aforementioned aqueous dispersion of the silicone rubber composition was mixed with an aqueous dispersion of tin octanoate having an average particle size equal to about 1 μm and prepared by emulsifying 1 part by weight of tin octanoate in 1 part by weight of a mixture of a secondary tetradecyl ether and secondary dodecyl ether of ethylene oxide (7 moles added) (dodecyl groups=43 wt. %, tetradecyl groups=57 wt. %, HLB=12.8) and 9 parts by weight of pure water. The mixture was allowed to stay for 1 day, and as a result, an aqueous dispersion of silicone rubber particles with 30% of solids was produced. The characteristics of the obtained silicone rubber particles are shown in Table 1.

Reference Example 4

A uniform mixture was prepared from the following components: 89.9 parts by weight of a polydimethylsiloxane end-capped with dimethylvinylsiloxy groups, having a viscosity of 400 mPa·s and containing 2.5 wt. % of a cyclic dimethylsiloxane oligomer mixture having a viscosity of 20 mm$^2$/s; and 10.1 parts by weight of a copolymer (viscosity=57 mPa·s) of a methylhydrogensiloxane and dimethylsiloxane capped with trimethylsiloxy groups (the content of silicon-bonded hydrogen atoms is 0.15 wt. %). The obtained mixture was further combined with 50.5 parts by weight of a 1% aqueous solution of a mixture prepared from a secondary tetradecyl ether and a secondary dodecyl ether of ethylene oxide (7 moles added) (dodecyl groups=43 wt. %, tetradecyl groups=57 wt. %, HLB=12.8). An aqueous dispersion was then prepared by emulsifying the obtained mixture in a colloid mill (colloid mill frequency=30 Hz).

An aqueous dispersion of a platinum-type catalyst with an average particle size of 0.3 μm was prepared by mixing 0.01 parts by weight of a solution prepared from isopropyl alcohol and 1,3-divinyl-1,1,3,3-tetramethyldisiloxane of a platinum-1,3-divinyl-1,1,3,3-tetramethyldisiloxane complex and 0.01 parts by weight of a surface-active agent prepared by mixing 1 part by weight of ion-exchange water with a mixture of a secondary tetradecyl ether and secondary dodecyl ether of ethylene oxide (7 moles added) (dodecyl groups=43 wt. %, tetradecyl groups=57 wt. %, HLB=12.8).

The aforementioned aqueous dispersion of the silicone rubber composition was uniformly mixed with the obtained aqueous dispersion of the platinum catalyst (in terms of weight units, the catalyst was added in an amount of 5 ppm metallic platinum per weight of the silicone-rubber composition). The mixture was allowed to stay for 1 day, the composition was cured by hydrosilylation, and as a result, an aqueous dispersion of silicone rubber particles with 50% of solids was produced. The characteristics of the obtained silicone rubber particles are shown in Table 1.

Reference Example 5

Methyltrimethoxysilane was gradually hydrolyzed by adding it dropwise to an aqueous solution of potassium hydroxide, and the water was separated by centrifugation. The product was washed to a sufficient degree with an aqueous solution of ethanol and with pure water and then dried in a hot-air-circulation oven at 100° C. to produce spherical polymethylsilsesquioxane. Characteristics of the obtained polymethylsilsequioxane are shown in Table 1.

TABLE 1

| Characteristics | | | Reference Example No. | | | | |
|---|---|---|---|---|---|---|---|
| | | | 1 | 2 | 3 | 4 | 5 |
| Average particle size (μm) | | | 10 | 0.4 | 0.4 | 10.6 | 0.5 |
| Hardness | | | 30 | 95 | 97 | 20 | >99 |
| Viscoelasticity | G'(×1000 dyne/cm$^2$) | 1 Hz | 274 | 273 | 61 | 211 | 191 |
| | | 10 Hz | 296 | 233 | 32 | 246 | 154 |
| | G''(×1000 dyne/cm$^2$) | 1 Hz | 33 | 157 | 28 | 23 | 89 |
| | | 10 Hz | 36 | 148 | 9 | 33 | 73 |
| | G*(×1000 dyne/cm$^2$) | 1 Hz | 276 | 315 | 67 | 212 | 210 |
| | | 10 Hz | 121 | 181 | 31 | 247 | 170 |
| | tanδ | 1 Hz | 0.12 | 0.58 | 0.36 | 0.11 | 0.47 |
| | | 10 Hz | 0.12 | 0.64 | 0.29 | 0.13 | 0.49 |
| Oil absorption (squalane g/g) | | | 0.58 | <0.27 | 0.38 | 0.30 | 0.53 |
| Mesh pass (wt. %) | #100 | | 27 | 100 | 100 | 6 | 100 |
| | #200 | | 5 | 98 | 95 | 2 | 99 |
| Bulk density (g/mL) | | | 0.28 | 0.32 | 0.43 | 0.33 | 0.23 |
| Repose angle (°) | | | 45 | 22 | 20 | 55 | 35 |

Practical Example 1

Figure 4:
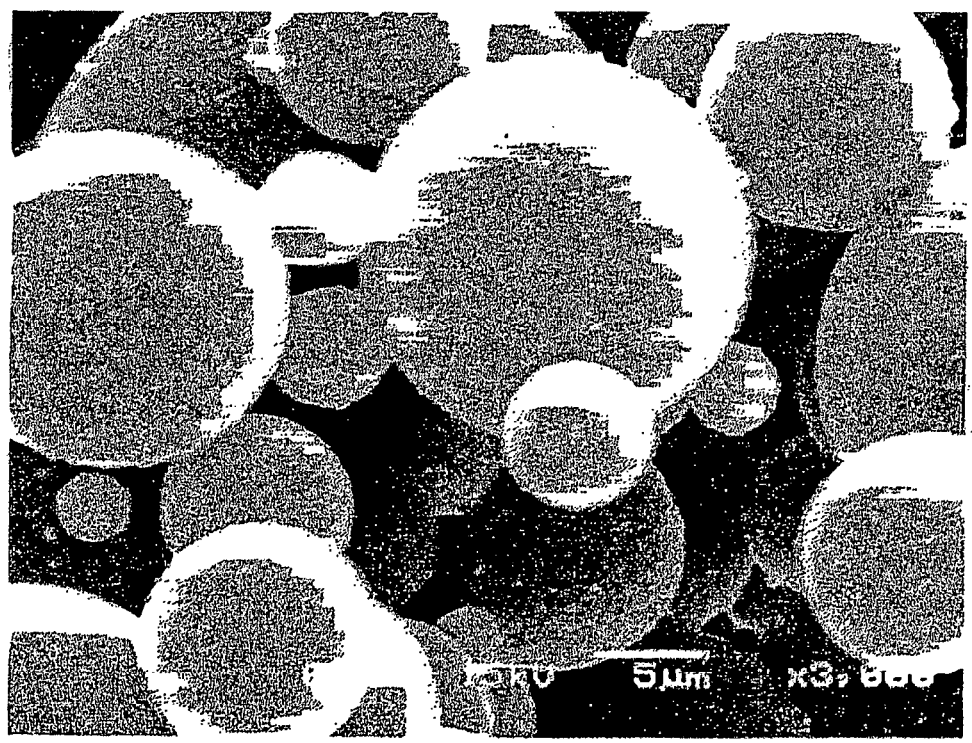
FIG. 4 is an electron-microscope photograph of silicone rubber particles obtained in Practical Example 1.
Figure 5:
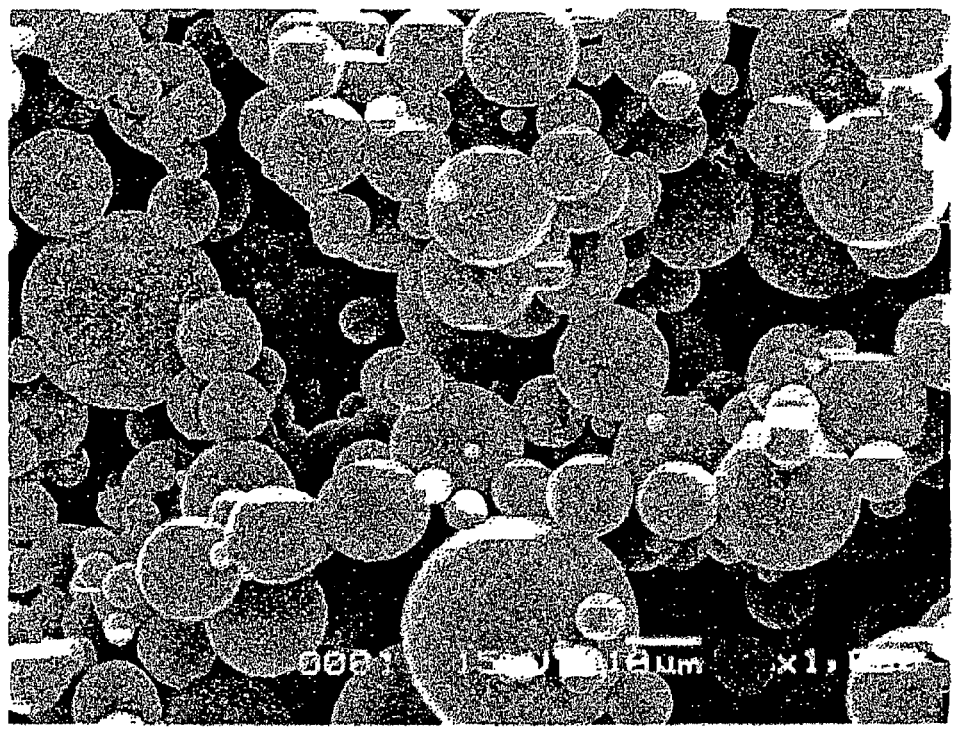
FIG. 5 is an electron-microscope photograph of silicone rubber particles obtained in Practical Example 1.

A mixture prepared from 40.1 parts by weight of the aqueous dispersion of silicone rubber particles obtained in Reference Example 1 and 2.01 parts by weight of the aqueous dispersion of silicone rubber particles obtained in Reference Example 2 was poured into a metal vat until a 5 mm-deep layer was formed, and then, to remove water, the mixture was allowed to stay under draft conditions for a week at room temperature. The obtained product was crushed in a mortar to form composite silicone rubber particles. Characteristics of the obtained composite silicone rubber particles are shown in Table 2. FIGS. 4 and 5 are photographs of the aforementioned composite silicone rubber particles taken on an electron microscope.

Practical Example 2

Figure 6:
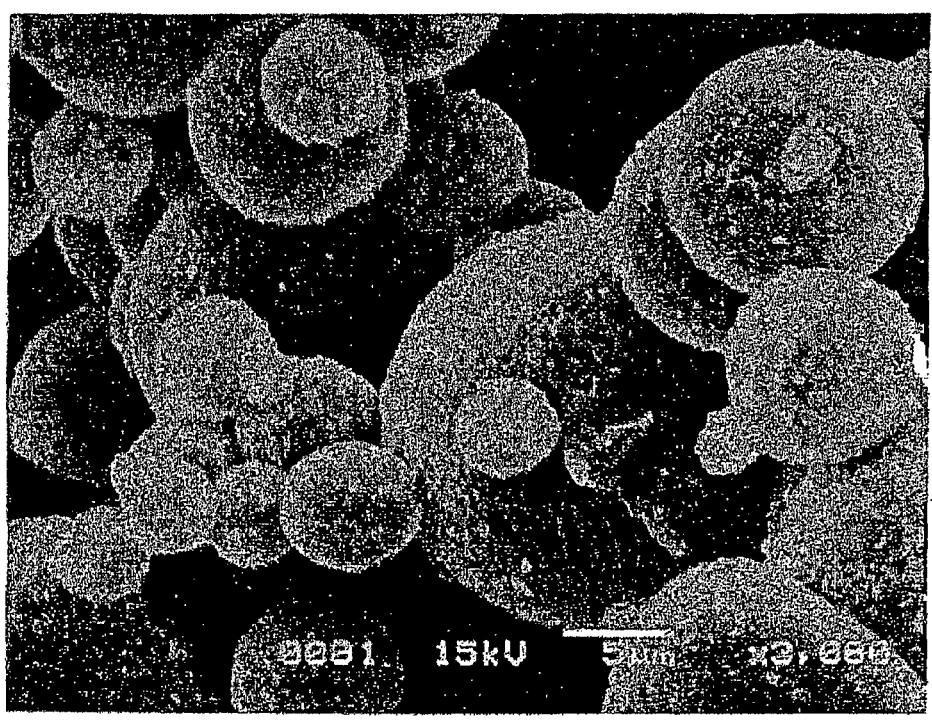
FIG. 6 is an electron-microscope photograph of silicone rubber particles obtained in Practical Example 2.
Figure 7:
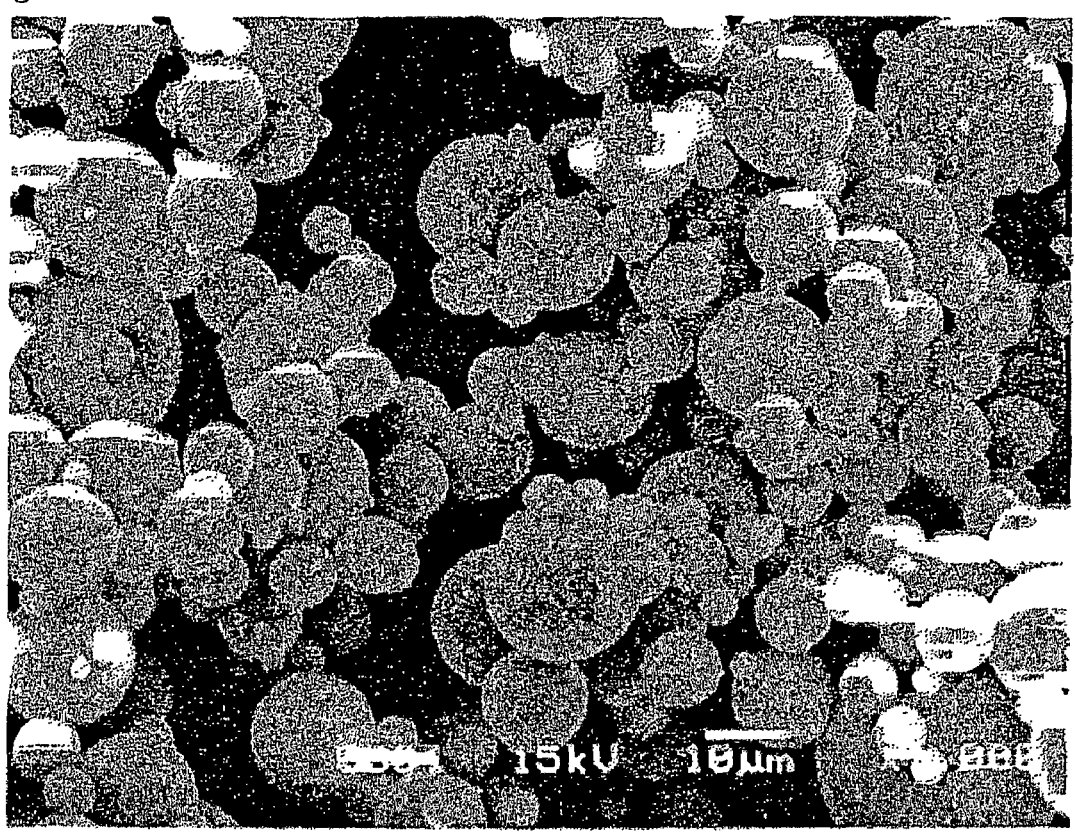
FIG. 7 is an electron-microscope photograph of silicone rubber particles obtained in Practical Example 2.

A mixture prepared from 40.1 parts by weight of the aqueous dispersion of silicone rubber particles obtained in Reference Example 1 and 4.01 parts by weight of the aqueous dispersion of silicone rubber particles obtained in Reference Example 2 was poured into a metal vat until a 5 mm-deep layer was formed, and then to remove water, the mixture was allowed to stay under draft conditions for a week at room temperature. The obtained product was crushed in a mortar to form composite silicone rubber particles. Characteristics of the obtained composite silicone rubber particles are shown in Table 2. FIGS. 6 and 7 are photographs of the aforementioned composite silicone rubber particles taken on an electron microscope.

Practical Example 3

A mixture prepared from 10.0 parts by weight of the aqueous dispersion of silicone rubber particles obtained in Reference Example 1 and 2.0 parts by weight of the aqueous dispersion of silicone rubber particles obtained in Reference Example 2 was poured into a metal vat until a 5 mm-deep layer was formed, and then to remove water, the mixture was allowed to stay under draft conditions for a week at room temperature. The obtained product was crushed in a mortar to form composite silicone rubber particles. Characteristics of the obtained composite silicone rubber particles are shown in Table 2.

Practical Example 4

A mixture prepared from 10.0 parts by weight of the aqueous dispersion of silicone rubber particles obtained in Reference Example 1 and 2.0 parts by weight of the aqueous dispersion of silicone rubber particles obtained in Reference Example 3 was poured into a metal vat until a 5 mm-deep layer was formed, and then to remove water, the mixture was allowed to stay under draft conditions for a week at room temperature. The obtained product was crushed in a mortar to form composite silicone-rubber particles. Characteristics of the obtained composite silicone rubber particles are shown in Table 2.

Practical Example 5

A mixture prepared from 10.0 parts by weight of the aqueous dispersion of silicone rubber particles obtained in Reference Example 1 and 5.0 parts by weight of the aqueous dispersion of silicone rubber particles obtained in Reference Example 3 was poured into a metal vat until a 5 mm-deep layer was formed, and then to remove water, the mixture was allowed to stay under draft conditions for a week at room temperature. The obtained product was crushed in a mortar to form composite silicone rubber particles. Characteristics of the obtained composite silicone rubber particles are shown in Table 2.

Practical Example 6

A mixture prepared from 10.0 parts by weight of the aqueous dispersion of silicone rubber particles obtained in Reference Example 4 and 5.0 parts by weight of the aqueous dispersion of silicone rubber particles obtained in Reference Example 3 was poured into a metal vat until a 5 mm-deep layer was formed, and then to remove water, the mixture was allowed to stay under draft conditions for a week at room temperature. The obtained product was crushed in a mortar to form composite silicone rubber particles. Characteristics of the obtained composite silicone rubber particles are shown in Table 2.

TABLE 2

| Characteristics | | | Practical Example No. | | | | | |
|---|---|---|---|---|---|---|---|---|
| | | | 1 | 2 | 3 | 4 | 5 | 6 |
| Viscoelasticity | $G'(\times 1000\ dyne/cm^2)$ | 1 Hz | 198 | 142 | 43 | 66 | 66 | 218 |
| | | 10 Hz | 136 | 145 | 44 | 63 | 65 | 231 |
| | $G''(\times 1000\ dyne/cm^2)$ | 1 Hz | 15 | 9 | 4 | 7 | 7 | 26 |
| | | 10 Hz | 17 | 10 | 4 | 7 | 8 | 32 |
| | $G^*(\times 1000\ dyne/cm^2)$ | 1 Hz | 198 | 142 | 43 | 66 | 66 | 220 |
| | | 10 Hz | 182 | 199 | 44 | 63 | 66 | 234 |
| | tanδ | 1 Hz | 0.08 | 0.07 | 0.10 | 0.11 | 0.10 | 0.12 |
| | | 10 Hz | 0.06 | 0.07 | 0.10 | 0.12 | 0.12 | 0.14 |
| Oil absorption (squalane g/g) | | | 0.57 | 0.49 | 0.38 | 0.53 | 0.44 | 0.32 |
| Mesh pass (wt. %) | #100 | | 100 | 100 | 100 | 100 | 100 | 100 |
| | #200 | | 97 | 99 | 99 | 95 | 98 | 98 |
| Bulk density (g/mL) | | | 0.25 | 0.22 | 0.31 | 0.31 | 0.38 | 0.26 |
| Repose angle (°) | | | 36 | 30 | 23 | 25 | 18 | 27 |

Comparative Example 1

A mixture prepared from 10.0 parts by weight of the aqueous dispersion of silicone rubber particles obtained in Reference Example 1 and 0.23 parts by weight of the polymethylsequioxane particles obtained in Reference Example 5 was poured into a metal vat until a 5 mm-deep layer was formed, and then to remove water, the mixture was allowed to stay under draft conditions for a week at room temperature. The obtained product was crushed in a mortar to form composite silicone rubber particles. Characteristics of the obtained composite silicone rubber particles are shown in Table 3.

Comparative Example 2

A mixture prepared from 10.0 parts by weight of the aqueous dispersion of silicone rubber particles obtained in Reference Example 1 and 0.49 parts by weight of the polymethylsequioxane particles obtained in Reference Example 5 was poured into a metal vat until a 5 mm-deep layer was formed, and then to remove water, the mixture was allowed to stay under draft conditions for a week at room temperature. The obtained product was crushed in a mortar to form composite silicone rubber particles. Characteristics of the obtained composite silicone rubber particles are shown in Table 3.

Comparative Example 3

A mixture prepared from 10.0 parts by weight of the aqueous dispersion of silicone rubber particles obtained in Reference Example 1 and 0.94 parts by weight of the polymethylsequioxane particles obtained in Reference Example 5 was poured into a metal vat until a 5 mm-deep layer was formed, and then to remove water, the mixture was allowed to stay under draft conditions for a week at room temperature. The obtained product was crushed in a mortar to form composite silicone rubber particles. Characteristics of the obtained composite silicone rubber particles are shown in Table 3.

Comparative Example 4

A mixture prepared from 10.0 parts by weight of the aqueous dispersion of silicone rubber particles obtained in Reference Example 1 and 2.52 parts by weight of the polymethylsequioxane particles obtained in Reference Example 5 was poured into a metal vat until a 5 mm-deep layer was formed, and then to remove water, the mixture was allowed to stay under draft conditions for a week at room temperature. The obtained product was crushed in a mortar to form composite silicone rubber particles. Characteristics of the obtained composite silicone rubber particles are shown in Table 3.

TABLE 3

| Characteristics | | | Comparative Example No. | | | |
|---|---|---|---|---|---|---|
| | | | 1 | 2 | 3 | 4 |
| Viscoelasticity | G'($\times 1000$ dyne/cm$^2$) | 1 Hz | 242 | 330 | 205 | 127 |
| | | 10 Hz | 260 | 352 | 213 | 121 |
| | G''($\times 1000$ dyne/cm$^2$) | 1 Hz | 28 | 41 | 29 | 29 |
| | | 10 Hz | 25 | 36 | 29 | 27 |
| | G*($\times 1000$ dyne/cm$^2$) | 1 Hz | 244 | 332 | 207 | 130 |
| | | 10 Hz | 261 | 354 | 215 | 124 |
| | tanδ | 1 Hz | 0.12 | 0.12 | 0.14 | 0.23 |
| | | 10 Hz | 0.10 | 0.10 | 0.14 | 0.22 |
| Oil absorption (squalane g/g) | | | 0.29 | 0.30 | 0.32 | 0.40 |
| Mesh pass (wt. %) | #100 | | 100 | 100 | 100 | 100 |
| | #200 | | 99 | 99 | 99 | 99 |
| Bulk density (g/mL) | | | 0.30 | 0.33 | 0.33 | 0.28 |
| Repose angle (°) | | | 60 | 52 | 38 | 42 |

INDUSTRIAL APPLICABILITY

The composite silicone rubber particles are characterized by exhibiting excellent flowability and dispersibility, and in case of adding the particles to various materials, improving tactile feeling, reducing inner stress, and providing lubricating and oil-and-fat absorption properties. Due to these properties, the composite particles can improve tactile sensation and reduce internal stress. Furthermore, since they possess lubricating and oil-and-fat absorption properties, these composite silicone rubber particles can be added to rubbers, plastics, coating materials, inks, waxes, cosmetic materials, etc., for imparting excellent heat-resistant, frost-resistant, weather-proof, water-repellent, mold-release, and stress-relaxation properties to them.

The invention claimed is:

1. Composite silicone rubber particles comprising silicone rubber particles A and silicone rubber particles B, wherein the surfaces of said particles A are covered with said particles B having sizes smaller than sizes of said particles A.

2. The composite silicone rubber particles of claim 1, wherein said silicone rubber particles A are spherical in shape.

3. The composite silicone rubber particles of claim 1, wherein the average particle size of said silicone rubber particles A is at least five times greater than the average particle size of said silicone rubber particles B.

4. The composite silicone rubber particles of claim 1, wherein the average particle size of said silicone rubber particles A is 1 to 500 μm and the average particle size of said silicone-rubber particles B is 0.01 to 50 μm.

5. The composite silicone rubber particles of claim 1, wherein the hardness of said silicone rubber particles A is lower than the hardness of said silicone rubber particles B.

6. The composite silicone rubber particles of claim 1, wherein the hardness of said silicone rubber particles A measured by a type-A durometer, as specified by JIS K 6253, does not exceed 50, and wherein the hardness of said silicone rubber particles B measured by a type-A durometer, as specified by JIS K 6253, is no less than 50.

7. The composite silicone rubber particles of claim 1, wherein said silicone rubber particles A and/or said silicone rubber particles B further comprise an optional ingredient selected from the group of silicone oils, organosilanes, inorganic particles, and organic particles.

8. A material selected from the group of rubbers, plastics, coating materials, inks, waxes, and cosmetic materials and comprising an additive comprising the composite silicone rubber particles of claim 1.

9. A method of manufacturing composite silicone rubber particles comprising silicone rubber particles B on the surfaces of silicone rubber particles A, said method being characterized by removing a dispersion medium from a dispersion or slurry that contains silicone rubber particles A and silicone rubber particles B having sizes smaller than those of said silicone rubber particles A.

10. The method of manufacturing composite silicone rubber particles according to claim 9, wherein said silicone rubber particles A are spherical in shape.

11. The method of manufacturing composite silicone rubber particles according to claim 9, wherein the average particle size of said silicone rubber particles A is at least five times greater than the average particle size of said silicone rubber particles B.

12. The method of manufacturing composite silicone rubber particles according to claim 9, wherein the average particle size of said silicone rubber particles A is 1 to 500 μm, and the average particle size of said silicone rubber particles B is 0.01 to 50 μm.

13. The method of manufacturing composite silicone rubber particles according to claim 9, wherein the hardness of said silicone rubber particles A is lower than the hardness of said silicone rubber particles B.

14. The method of manufacturing composite silicone rubber particles according to claim 9, wherein the hardness of said silicone rubber particles A measured by a type-A durometer, as specified by JIS K 6253, does not exceed 50 and wherein the hardness of said silicone rubber particles B measured by a type-A durometer, as specified by JIS K 6253, is no less than 50.

15. The method of manufacturing composite silicone rubber particles according to claim 9, wherein said dispersion or slurry is aqueous.

16. The method of manufacturing composite silicone rubber particles according to claim 9, wherein said dispersion medium is water and said method further comprises the step of removing said water from said dispersion or slurry.

17. The method of manufacturing composite silicone rubber particles according to claim 16, wherein said water is removed from said dispersion or slurry by condensing.

* * * * *